United States Patent
Veggalam et al.

(10) Patent No.: US 12,127,056 B2
(45) Date of Patent: Oct. 22, 2024

(54) MACHINE-LEARNING FREQUENCY LAYER MANAGEMENT AND HANDOVER PARAMETER TUNING

(71) Applicant: T-Mobile USA, Inc., Bellevue, WA (US)

(72) Inventors: Vijay Veggalam, Parsippany, NJ (US); Nirmal Chandrasekaran, Hillsborough, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 440 days.

(21) Appl. No.: 17/505,395

(22) Filed: Oct. 19, 2021

(65) Prior Publication Data

US 2022/0124574 A1   Apr. 21, 2022

Related U.S. Application Data

(60) Provisional application No. 63/093,660, filed on Oct. 19, 2020.

(51) Int. Cl.
*H04W 36/08*   (2009.01)
*H04W 36/00*   (2009.01)
(Continued)

(52) U.S. Cl.
CPC ....... *H04W 36/0083* (2013.01); *H04W 36/06* (2013.01); *H04W 36/08* (2013.01);
(Continued)

(58) Field of Classification Search
None
See application file for complete search history.

(56) References Cited

U.S. PATENT DOCUMENTS

| 10,397,043 B2 | 8/2019 | Tapia et al. |
| 2006/0285489 A1 | 12/2006 | Francisco et al. |

(Continued)

FOREIGN PATENT DOCUMENTS

| CN | 110662264 A | * | 1/2020 | ........ H04W 36/0011 |
| CN | 117412365 A | * | 1/2024 | |

(Continued)

OTHER PUBLICATIONS

Office Action for U.S. Appl. No. 17/745,277, mailed on Sep. 27, 2023, Shori, "Machine Learning Monitoring of Wireless Network Infrastructure Application Servers ", 18 pages.

*Primary Examiner* — Kodzovi Acolatse
(74) *Attorney, Agent, or Firm* — Lee & Hayes, P.C.

(57) ABSTRACT

Machine-learning based techniques are described herein for determining and modifying handover parameters within multilayer wireless networks. Various communication session data, such as key performance indicators, may be analyzed and compared at multiple frequency layers to determine sets of custom parameters associated with one or more wireless networks. The sets of custom parameters and network performance data may be used to train one or more machine-learned models to improve and/or optimize the handover parameters used by the network nodes. In some examples, different trained models may be associated with different network performance metrics, such as throughput optimization, network speed, and/or dropped call minimization, etc. A trained machine-learned model may be used to analyze the session data from a set of network nodes, and to determine or tune the handover parameters used by the network nodes.

16 Claims, 7 Drawing Sheets

(51) Int. Cl.
*H04W 36/06* (2009.01)
*H04W 36/16* (2009.01)
*H04W 36/22* (2009.01)
*G06N 20/00* (2019.01)

(52) U.S. Cl.
CPC ......... *H04W 36/165* (2013.01); *H04W 36/22* (2013.01); *G06N 20/00* (2019.01)

(56) References Cited

U.S. PATENT DOCUMENTS

| | | | |
|---|---|---|---|
| 2016/0050587 A1* | 2/2016 | Lam | H04W 36/22 |
| | | | 370/235 |
| 2018/0368037 A1* | 12/2018 | Wang | H04W 36/06 |
| 2019/0213504 A1 | 7/2019 | Vasseur et al. | |
| 2020/0120000 A1 | 4/2020 | Parthasarathy et al. | |
| 2020/0413325 A1* | 12/2020 | Meredith | H04W 48/16 |
| 2021/0168684 A1* | 6/2021 | Kang | H04W 36/08 |
| 2022/0124574 A1* | 4/2022 | Veggalam | H04W 36/0083 |
| 2023/0078661 A1 | 3/2023 | Wei et al. | |
| 2023/0377460 A1* | 11/2023 | Sivanesan | H04W 4/44 |

FOREIGN PATENT DOCUMENTS

| | | | | |
|---|---|---|---|---|
| WO | WO-2013024408 A1 * | 2/2013 | | H04W 28/0236 |
| WO | WO-2021194176 A1 * | 9/2021 | | H04W 24/02 |

\* cited by examiner

MACHINE-LEARNING FREQUENCY LAYER MANAGEMENT AND HANDOVER PARAMETER TUNING

CROSS-REFERENCE TO RELATED APPLICATIONS

This application is a nonprovisional application of, and claims priority to and the benefit of, U.S. Patent Application Ser. No. 63/093,660, filed Oct. 19, 2020, and entitled "Machine-Learning Frequency Layer Management and Handover Parameter Tuning," the entire contents of which are incorporated herein by reference for all purposes.

BACKGROUND

Modem telecommunications networks such as cellular telephone networks can support a variety of types of communications sessions, including voice, video, and/or messaging sessions. For example, second-generation (2G) and third-generation (3G) cellular networks, such as Global System for Mobile Communications (GSM) networks or Universal Mobile Telecommunications System (UMTS) networks may carry generally stream media over circuit-switched connections. In contrast, fourth-generation (4G) cellular networks such as Long Term Evolution (LTE) networks and fifth-generation (5G) cellular networks such as the Third-Generation Partnership Project (3GPP) 5G System may generally carry streaming media over packet-switched connections which can provide greater speed and throughput than circuit-switched connections. Certain networks may include a single radio access technology while others may include wireless access networks spanning multiple technology generations, for example, due to the substantial infrastructure investment needed to expand cellular networks.

Additionally, some wireless network may divide the total set of available channels into different groups (or layers) based on frequency band. For instance, within a single radio access technology, the network may define different layers corresponding to different sets of frequencies, such as low-band, mid-band, and high-band frequency layers. Additionally, in some cases different frequency layers may be served using different radio access technologies. While a user equipment (UE) terminal device is connected to the wireless network, the network may transfer the UE device from one frequency layer to another for various reasons. Such transfers may be referred to as handovers (or interlayer handovers), and the network may use a set of configurable parameters (or handover parameters) to determine when a handover is to be performed.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be, in at least one example, included in the first component or operation.

DETAILED DESCRIPTION

Overview

Figure 1:
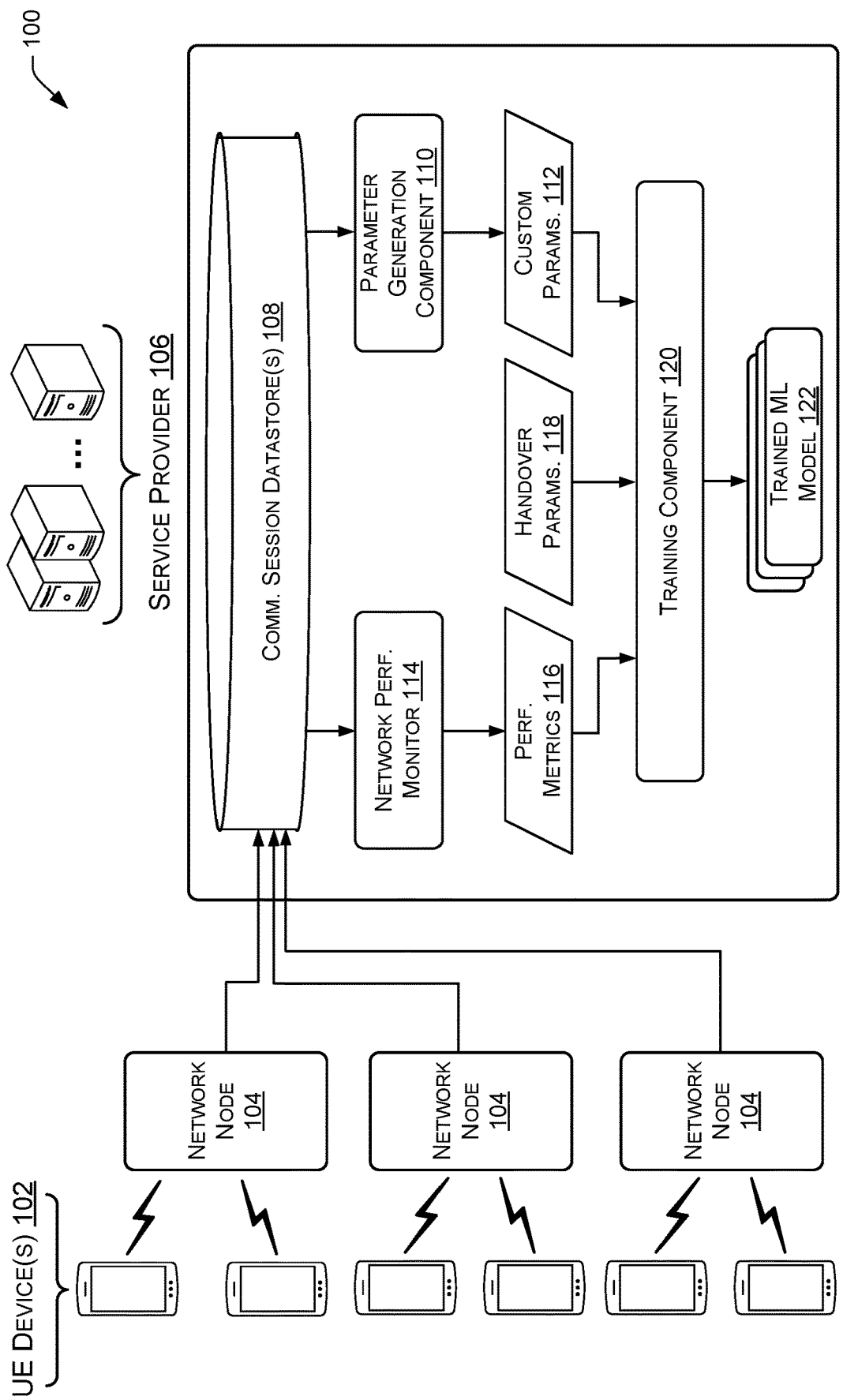
FIG. 1 is a block diagram illustrating components of an example system for training machine-learned models to determine handover parameters for a wireless network, in accordance with one or more implementations of the disclosure.

Various techniques described herein relate to training and using machine-learned models to determine and modify handover parameters within wireless communication networks. In some examples, a machine learning system may receive communication session data associated with a number of connections between user equipment devices (which may be referred to as "UE devices" or "UEs") and network resources (or nodes) in the wireless network. The communication session data, which may include key performance indicator (KPI) data and/or other session data, can be analyzed and used to generate custom parameters associated with a subset of the wireless network. For instance, custom parameters may include difference values and/or ratios between frequency layers in network utilization, traffic volume, numbers of handovers, etc. After generating a set of custom parameters based on frequency layer differences, ratios, and/or handover data from a set of network nodes, the machine learning system may use the custom parameters to train a machine-learned model to determine sets of configuration parameters (referred to as handover parameters) to control the network nodes. In some examples, different machine-learned models may be trained to output different sets of handover parameters, to improve or optimize different performance metrics such as throughput optimization, network speed, use of spectrum, minimization of dropped calls, and the like.

Accordingly, the techniques described herein may include configuring nodes within wireless networks to perform handover operations for UEs such as mobile phones and other mobile terminal devices. As noted above, moving a UE from one frequency layer to another may be referred to a "handover," and handovers can be performed by the network nodes of a wireless network for various reasons, such as to maintain coverage, improve connection quality/speed, and/or to balance load between frequency layers. Interlayer (or interfrequency) handovers can be performed between two frequency layers of the same radio access technology (e.g., between two 4G frequency layers or two 5G frequency layer), or between frequency layers of different radio access technologies. In some examples, the nodes of a wireless network can be configured to perform handovers of certain UEs based on a set of handover parameters. Handover parameters may define one or more threshold values relating to coverage, signal strength, connection quality/speed, etc. During an active connection (or communication session) with a UE device, the wireless network may monitor the connection and compare the current data metrics for the connection (e.g., signal strength, network speed, throughput, etc.) to the current set of handover parameters to determine that the UE should be moved from one frequency layer to another during the connection.

To implement UE interlayer handovers during the operation of the wireless network, one or more nodes of the wireless network (e.g., entry nodes, access nodes, proxy servers, etc.) may be configured to monitor the connections within different layers and use the handover parameters to determine both when a UE should be moved to a different frequency layer, and the frequency layer to which the UE should be moved. For instance, a node (e.g., cell cite) within an access network may use the handover parameters for the wireless network (or a subset of the wireless network) to determine that a particular UE to which it is currently connected should be moved to from mid-band frequency connection to a low-band frequency connection within the same node or a different node. Each handover parameters may correspond to one or more threshold values that can trigger the handover of a UE device to a different frequency layer, based on the carrier-to-interference ratio ("C/I") for the UE device, a received signal level by the UE device, a user speed level, a path loss indicator, alarm events within the wireless network, and the like.

Certain conventional wireless networks may determine a common set of handover parameters used by all network nodes (e.g., cell sites) to manage interlayer handovers. However, applying a common set of handover parameters across an entire wireless network can negatively impact both the network quality and capacity performance, because network usage can vary significantly across different network nodes. As a result, when a single common set of handover parameters are applied across the entire network (or a large sub-network), certain nodes may perform handovers in undesirable conditions for network performance, while other nodes may fail to perform handovers under desirable conditions for a handover. The techniques described herein provide technical advantages over these conventional networks, by determining sets of handover parameters for individual nodes (e.g., cell sites and/or sectors) or groupings of nodes, which may provide improved network capacity and connection quality. Further, the machine-learning based techniques described herein may provide additional advantages over conventional systems using either machine-learning or heuristic based techniques. For instance, by training models based on custom parameters representing interlayer differences or ratios between network utilization, volume, handovers, and the like, rather than based on raw communication session data (e.g., KPI data), models may be trained more effectively to improve or optimize specific desired network performance metrics (e.g., throughput, spectrum use, dropped call minimization, etc.).

FIG. 1 illustrates an example wireless telecommunications network 100, including components that may be involved in providing and monitoring communication sessions between UE devices 102 and one or more network nodes 104. In this example, the network 100 also includes a back-end service provider 106, implemented using one or more servers or other computing devices, with components configured to train machine-learned models based on the communication session data, to output handover parameters for the network nodes 104.

As noted above, "user equipment" or "UE" device may be a communication device, such as cellular telephone or other mobile terminal device, configured to perform, or communicate with systems configured to perform, techniques described herein. UE device can include, for example, wireless or wired voice- or data-communication devices. A UE device may include a user interface (e.g., as does a smartphone), but is not required to. For example, a UE device may include a streaming server configured to provide audio or visual content on demand. Such UE devices need not include user interfaces, and may instead respond to other UE devices that form queries and send those queries to the server in response to actions taken via interfaces at those other UE devices. In various examples, UE devices 102 can be, for instance, cellular phones, smartphones, tablet or laptop computers, personal digital assistants (PDA), smartwatches or other wearable computing devices, personal computers (PCs) or desktop workstations, servers, media centers, vehicle-based computing devices, and the like. UE devices 102 may be configured to initiate communication sessions via the network 100, or to receive and respond to communication session requests. In various examples, the network 100 may identify and communicate with a UE device 102 using a unique identifier. As used herein, a "unique identifier" and similar terms may include both truly unique identifiers (e.g., Ethernet MAC addresses that are unique by construction, or Version 1 UUIDs) and/or identifiers with a negligible probability of collision (or non-uniqueness) such as SHA256 hashes of data uniquely identifying an object, or Version 4 UUIDs.

The terms "session" and "communication session" as used herein may refer to a communications path for bidirectional exchange of data among two or more computing devices. For example, communications sessions may refer to sessions between multiple UE devices 102 that take place over the network 100, and/or to sessions between a UE device 102 and node of a wireless network (e.g., an entry node, proxy server, application server, etc.). Examples of sessions may include, but are not limited to, voice and video calls by which human beings may converse, data communication sessions between two electronic systems or between an electronic system and a human being, and/or a Rich Communication Suite (RCS, also known as JOYN) sessions, and the like. Sessions can be carried (or provided) by cellular or data networks, including but not limited to LTE or Institute of Electrical and Electronics Engineers (IEEE) 802.11 (WIFI). Other examples of networks that may carry communication sessions are discussed below.

As shown in this example, UE devices 102 may communicate with the network via nodes 104. Nodes 104 may represent entry nodes (e.g., cell sites) of an access network, by which the UE devices 102 may initiate or receive communication sessions with other devices over the network 100. In various examples, each node 104 may correspond to a cell site, or a particular sector within a multi-sector cell site. Additionally or alternatively, a node 104 may be associated with a particular radio access technology and/or frequency band (e.g., mid-band, low-band, etc.). In some examples, handovers may include a handover of a UE connection from one node 104 to another node 104. As noted above, UE handovers may be performed between two different cell sites or sectors, and such handovers may include interlayer handovers or intralayer handovers (e.g., handovers within the same frequency layer). Interlayer handovers also may be performed between two frequency layers within the same cell site and/or sector. In such examples, multiple nodes may be implemented within the same cell site (and/or may be associated with the same sector), and each node 104 may represent a frequency layer provider at the particular cell site/sector.

In some cases, the service provider 106 may include components configured to train machine-learned model(s) based on communication session data received from the network nodes 104, to determine improved (and/or optimized) sets of handover parameters. As described in more detail below, a training component 120 may use various custom parameters based on KPI data and another network monitoring data, the current set of handover parameters utilized by the network nodes 104, and the desired performance metric(s) to be optimized, to train one or more machine-learned models to output handover parameters. A trained machine-learned model generated by the training component may be configured to output sets of handover parameters that, when applied to the one or more nodes 104, may improve and/or optimize the network performance with respect to the desired performance metric(s) (e.g., throughput, network speed, call quality, use of spectrum, minimization of network costs, minimization of dropped calls, etc.).

As shown in this example, the service provider 106 may include a data store 108 configured to receive and store various communication session data from the network nodes 104. In some examples, a group of network nodes 104 may periodically aggregate and transmit various connection and/or session data to the service provider 106, including any attribute or combination of attributes associated with a connections/sessions between a UE device (e.g., a mobile device or mobile terminal), and network resource (e.g., a network node). In some examples, the communication session data may include a combination of network key performance indicator ("KPI") data for the network. By way of example, the KPI data received from a network node 104 may include carrier-to-carrier interference ratios ("C/I"), received signal levels, network speed levels, path loss indicators, and the like. Additionally, the network data received from the nodes 104 also may include alarm events in the communication network.

Additional examples of KPI data that may be provided from the network nodes 104 to the data store 108 may include KPIs related to device usage, status, and health, such as CPU and memory utilization, temperature, and fan status, for any and all of the physical and virtual devices within the nodes 104 and/or other devices involved in providing wireless service to the UE devices 102. The KPI data received and stored in the data store 108 also may include data availability data, latency data, packet loss data, variation in delay data (or jitter), network traffic volume data, errors and discards per interface for inbound and outbound traffic, and interface availability or inactivity.

In some examples, the service provider 106 may include a parameter generation component 110 configured to determine one or more custom parameters based on the KPI data, and/or based on other network monitoring data stored within the data store 108. As noted above, certain custom parameters may be generated to reflect a ratio and/or a difference in network usage or performance metrics between two different frequency layers. As an example, the parameter generation component 110 may generate a custom parameter 112 based on the ratio of traffic volume between one frequency layer (e.g., a L2100 4G mid-band layer) and a second frequency layer (e.g., a L1900 4G mid-band layer) in the same cell (e.g., the same node 104). As another example, a custom parameter 112 may be generated based on the ratio of traffic volume between an L600 low-band 4G frequency layer and a L2100 4G mid-band frequency layer in the same cell. As yet another example, a custom parameter 112 may be generated based on the ratio of traffic volume between an L700 low-band 4G frequency layer and the total combined traffic volume of all 4G frequency layers (e.g., the sum of L600, L700, L1900, and 2100) in the same cell. In other examples, the parameter generation component 110 may generate a custom parameter 112 based on the difference in physical resource block (PRB) utilization between one frequency layer (e.g., a L2100 4G mid-band layer) and a second frequency layer (e.g., a L1900 4G mid-band layer) in the same cell (e.g., the same node 104). As another example, a custom parameter 112 may be generated based on the difference in physical resource block (PRB) utilization between a L600 4G low-band frequency layer and a L2100 4G mid-band layer in the same cell. As yet another example, a custom parameter 112 may be generated based on the difference in physical resource block (PRB) utilization between a L700 4G low-band frequency layer and a L1900 4G mid-band layer in the same cell. It can be understood from the context of this disclosure that the various interlayer custom parameters (e.g., parameters based on the differences or ratios of network usage/performance metrics from different frequency layers) described herein are examples only and non-limiting. In other examples, the parameter generation component 110 may compute custom parameters based on a difference, a ratio, or any other combination of network/resource usage data, performance data, handover data, or the like, between multiple different frequency layers.

The training component 120 may receive and use the custom parameters 112 to train a machine-learning model to output one or more handover parameters based on an input set of custom parameters. Along with the custom parameters 112, the training component 120 may use as input data one or more network performance metrics 116 determined by a network performance monitor 114, and the current set of handover parameters 118. In some examples, the custom parameters 112, network performance metrics 116, and handover parameters 118 may be associated with one another, and may be based on the same set of communication session data received from the same set of network nodes 104. The combination of the custom parameters 112, network performance metrics 116, and handover parameters 118 may be used as an associated set of ground truth data for training one or more machine-learned models 122. For instance, custom parameters 112 maybe generated (as described above) based on connection or session data associated with a number of UE communication sessions received from one or more network nodes 104. The network performance metrics 116 may represent one or more measurements of network performance (e.g., throughput, network speed, call quality, use of spectrum, minimization of network costs, minimization of dropped calls, etc.) based on the same UE communication sessions from which the custom parameters 112 were generated. Additionally, the current handover parameters 118 may represent the handover parameters used by the network node(s) 104 at the time of the same UE communication sessions. Accordingly, the training component 120 may generate and train one or more machine-learned models, based on the training data, to output a set of handover parameters that improves (e.g., optimizes) one or more desired network performance metrics, based on the custom parameters exhibited by a network node 104 or group of associated network nodes 104. In various examples, the training component 120 may generate one or more network/model structures, and may use one or a combination of machine-learning algorithms to train the model, including but not limited to regression algorithms, instance-based algorithms, Bayesian algorithms, decision tree algorithms, clustering algorithms artificial neural network algorithms, and/or deep learning algorithms.

As shown in this example, the training component 120 may be used to generate multiple trained models 122 based on the same set of training data. In some cases, models may be trained to improve or optimize for particular network performance metrics. A first machine-learned model 122 may be trained to improve/optimize call quality, while a second machine-learned model 122 may be trained to minimize network cost while maximizing throughput, and third machine-learned model 122 may be trained to minimize dropped calls, etc.

Figure 2:
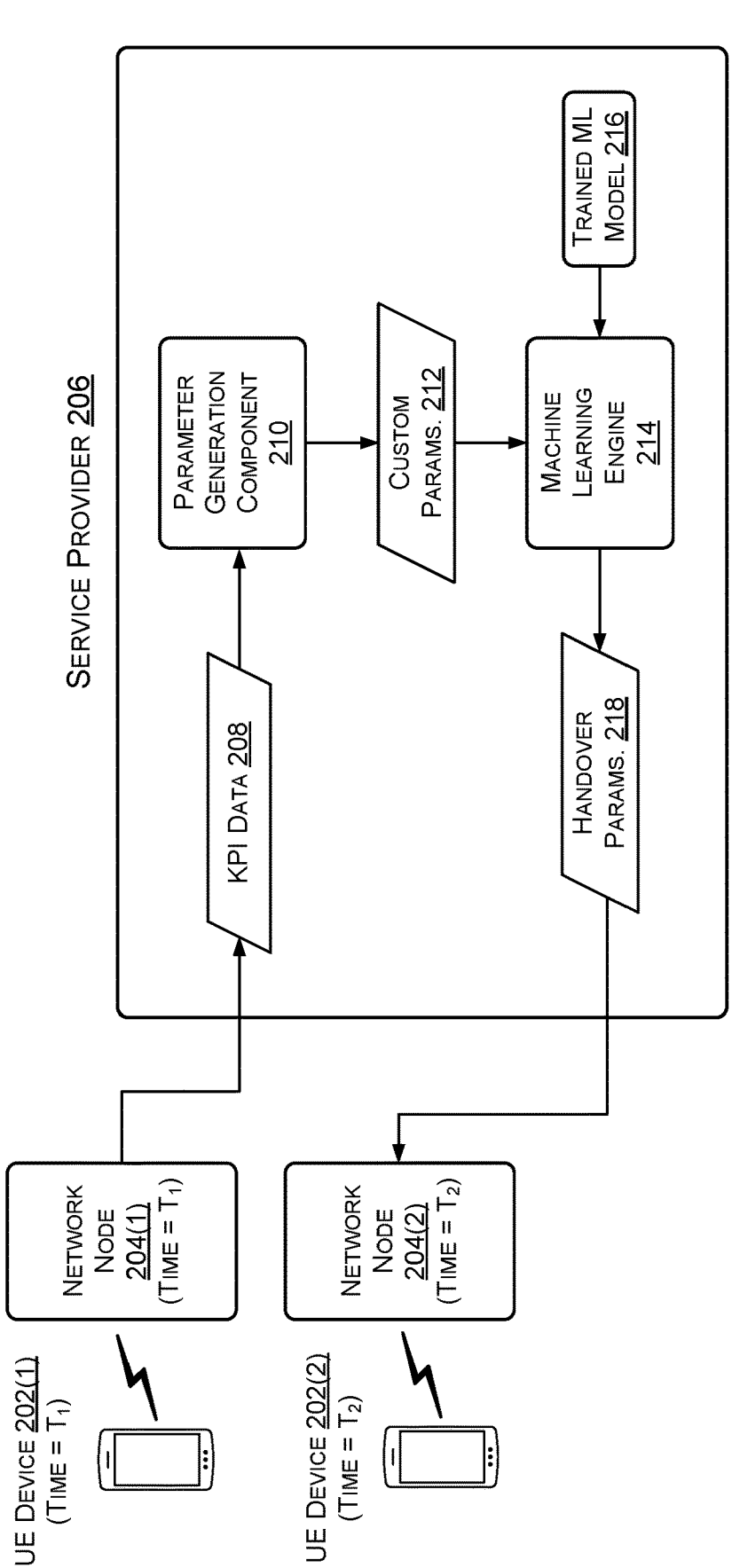
FIG. 2 is a block diagram illustrating components of an example system for determining handover parameters for one or more network nodes using a trained machine-learned model, in accordance with one or more implementations of the disclosure.

FIG. 2 illustrates another example wireless telecommunications network 200, including components that may be involved in providing and monitoring communication sessions between UE devices 202 and network nodes 204, including determining and initiating handover operations for the UE devices between different frequency layers and/or different network nodes 204. In this example, the network 200 also includes a back-end service provider 206, implemented using one or more servers or other computing devices, with components configured to execute one or more train machine-learned models, and to output and provide updated handover parameters to the network nodes 204.

In some examples, the wireless telecommunications network 200, and the various devices, systems, and components described herein, may be similar or identical to the wireless telecommunications network 100 and corresponding components described above. For instance, UE devices 202 may be similar or identical to the UE devices 102, and the network nodes 204 may be similar or identical to the network nodes 104 described above, Additionally, the service provider 206 may be similar or identical to the service provider 106. Within the service provider 206, the parameter generation component 210 may be similar or identical to the parameter generation component 110, although the parameter generation component 110 generates custom parameters used for training data while the parameter generation component 210 generates custom parameters used as input data. Additionally, the trained machine-learned model 216 in this example may be similar or identical to one or more of the trained machine-learned models 122 described above.

As shown in this example, the network node 204 (e.g., a cell) may capture and transmit KPI data 208 to a parameter generation component 210. The KPI data 208 may be associated with a number of connections (or communication sessions) between the node 204 and a UE device 202. The KPI data 208 may include any of the types of communication session data stored within the communication sessions data store 108 described above. In some examples, the KPI data 208 may be associated with the UE connections served by a single network node 204 over a period of time, including connections served over multiple different frequency layers. Additionally or alternatively, the KPI data 208 may represent KPI data associated with one or more particular sectors (e.g., excluding other sectors) of the network node 204, and/or may represent KPI data associated with multiple different network nodes 204 (e.g., a subset of cells within a related geographic region).

The KPI data 208 captured and transmitted by the network node 204 may represent the UE connections served by the network node 204 during a first time period (e.g., Time=$T_1$). As described below, the service provider 206 may use the KPI data 208 to determine updated handover parameters, which may be provided to the network node 204 and applied at a later time (e.g., Time=$T_2$). In some examples, a single network node 204 or a group of associated network nodes 204 may be configured to periodically capture, store, and transmit updated KPI data 208 to the service provider 206 (e.g., every minute, hour, day, etc.), in order to periodically receive updated handover parameters for interfrequency handovers (and/or intrafrequency handovers), to improve the quality and efficiently of the network service provided to the UE devices 202.

As shown in this example, the service provider 206 may receive the KPI data 208 from a network node(s) 204, and use a parameter generator component 210 to generate one or more custom parameters 212 reflecting the network usage, network performance, and/or handover operations of the network node(s) 204. The types of the custom parameters 212 may include the same (or similar) types of the custom parameters 112 used as ground truth data to train machine learning models 122, described above. For instance, custom parameters 212 may include one or more parameters representing a ratio and/or a difference value between network usage or performance metrics for two different frequency layers, within the UE communication session data captured by the network node(s) 204.

The machine learning engine 214 may receive the custom parameters 212, and provide the custom parameters 212 as input to a trained machine-learned model 216. As noted above, the trained machine-learned model 216 may be trained to improve or optimize based on a specific type of network performance metric (e.g., throughput, network speed, call quality, spectrum use, cost minimization of dropped calls minimization, etc.), or a combination of multiple network performance metrics. Accordingly, in some cases different trained machine-learned models 216 may be used for different network nodes 204, so that the handover parameters are determined for based on the different desired network performance priorities of the network nodes 204.

As shown in this example, custom parameters 212 (e.g., interlayer differences or ratios of network usage/performance data) may be used as input data to the trained machine-learned model 216. Additionally or alternatively, the trained machine-learned model 216 may receive additional data, including any of the various types of KPI data described herein, and/or the current set of the handover parameters used by the network node(s) 204 that generated the KPI data 208.

In some cases, after determining a set of handover parameters 218 based on the output of the trained machine-learned model 216, the handover parameters 218 may be provided to the network node(s) 204, which may configure their connection management and monitoring systems to operate in accordance with the updated handover parameters 218. In some cases, the service provider 206 may compare the determined handover parameters 218 to the existing (or previous) set of handover parameters used by the network node(s) 204. When the differences between the determined handover parameters 218 and the existing/previous handover parameters of the network node(s) 204 are below a threshold difference, the service provider 206 may determine that the new/updated handover parameters 218 need not be transmitted to the network node(s) 204. However, when the differences between the determined handover parameters 218 and the existing/previous handover parameters meet or exceed a threshold difference value (e.g., on a parameter-by-parameter basis, or using an aggregated and/or weighted difference including multiple parameters, etc.) the service provider 206 then may transmit the handover parameters to the node(s) 204. As described above, the network node(s) 204 may apply the updated handover parameters to one or more sectors of a cell, one or more frequency layers served by a cell, to all sectors and/or frequency layers provided by the cell, and/or to groups of multiple related cells within the wireless communication network 200.

Figure 3:
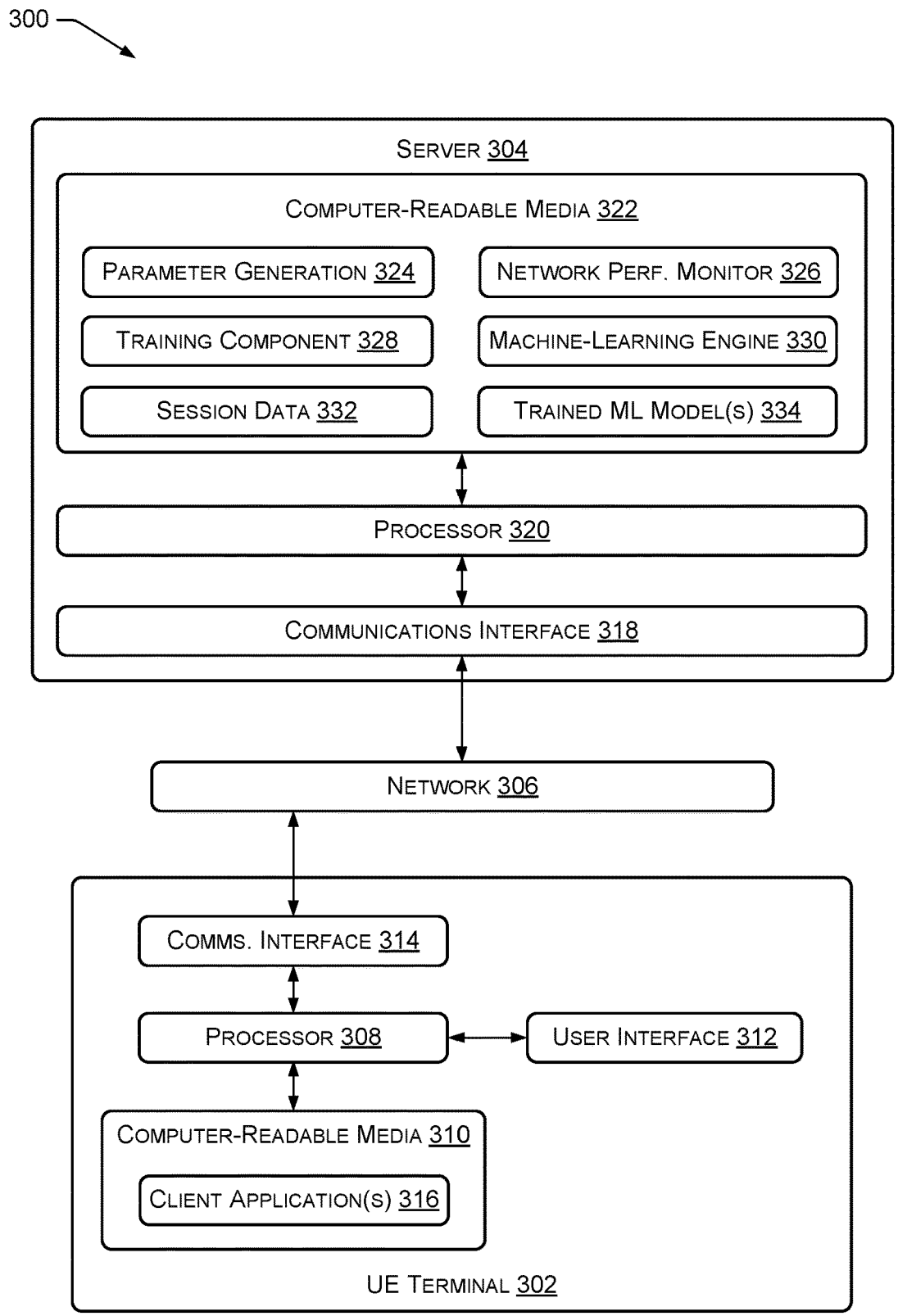
FIG. 3 is a block diagram illustrating components of one or more network nodes and user equipment devices used in one or more implementations of the disclosure.

FIG. 3 is a block diagram illustrating an example computing environment 300, on which various techniques described herein may be implemented. For instance, the computing environment 300 may be configured to provide and monitor communication sessions between UE devices and network nodes of a wireless network, perform interlayer UE handovers based on handover parameters, and train and execute machine-learned models to determine updated handover parameters for network nodes. The computing environment 300 includes a terminal 302 (which can represent UE device 102 or UE device 202) communicatively connectable with a server 304 via a network 306. The server 304 can represent a service provider 106 and/or service provider 206, a network node 104 or 204, and/or another control system of a telecommunications network configured to perform functions described herein. Server 304 can be implemented using dedicated or shared (e.g., cloud) computing hardware. The network 306 can include one or more networks, such as a cellular network, e.g., 5G, or a non-cellular network, e.g., WIFI. Example network technologies are described above with reference to FIG. 1 and FIG. 2. In some examples, a SAS, Domain Proxy, CBSD, base stations, access point, or terminal can include one or more components shown in FIG. 3, and can connect to one or more wired or wireless networks.

The terminal 302 can include one or more processors 308, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). Terminal 302 can include one or more computer readable media (CRM) 310, such as semiconductor memory (e.g., RAM, read-only memory (ROM), solid state drives (SSDs), or the like), disk drives (e.g., platter-based hard drives), another class of computer-readable media, or any combination thereof. The terminal 302 can further include a user interface (UI) 312, e.g., including an electronic display device, a speaker, a vibration unit, a touchscreen, or other devices for presenting information to a user and receiving commands from the user. The terminal 302 can further include one or more communications interface(s) 314, e.g., radio(s) or other network interface(s), configured to selectively communicate (wired or wirelessly) via the network 306, e.g., via an access network and/or network nodes 104 and 204.

CRM 310 can be used to store data and to store instructions that are executable by the processors 308 to perform various functions as described herein. CRM 310 can store various classes of instructions and data, such as an operating system, device drivers, program modules, etc. The processor-executable instructions can be executed by the processors 308 to perform the various functions described herein. CRM 310 may be or may include computer-readable storage media. Computer-readable storage media include, but are not limited to, registers, floppy disks, hard disks, SSDs, bar codes, Compact Discs (e.g., CD-ROM), digital versatile disks (DVDs), other optical storage, ROM, erasable programmable read-only memories (EPROM, EEPROM, or Flash), random-access memories (RAMs), other semiconductor memory technology, magnetic cassettes, magnetic tape, magnetic disk storage or other magnetic storage devices, or any other tangible, non-transitory medium which can be used to store the desired information and which can be accessed by the processors 308. In some examples, CRM 310 can include a non-volatile memory in a Subscriber Identity Module (SIM) card.

CRM 310 can include processor-executable instructions of a client application 316. In some examples, terminal 302 can be configured to, e.g., by executing the processor-executable instructions, initiate or receive sessions, attach to networks, or handover between networks, e.g., as defined in LTE, 5G, and IMS specifications. The client application 316, e.g., a native or other dialer, can permit a user to originate and receive communication sessions, e.g., voice or Unstructured Supplementary Service Data (USSD), associated with the terminal 302. The client application 316 can additionally or alternatively include an SMS, RCS, or presence client, or a client of another telephony service offered by the server 304.

In some examples, server 304 can communicate with (e.g., is communicatively connectable with) terminal 302 or other nodes or devices via network 306 using one or more communications interface(s) 318, e.g., network transceivers for wired or wireless networks, or memory interfaces. Example communications interface(s) 318 can include Ethernet or FIBRE CHANNEL transceivers, WIFI radios, or DDR memory-bus controllers (e.g., for DMA transfers to a network card installed in a physical server 304). Communications interface(s) 314 can include any of the components described herein.

The server 304 can include one or more processors 320 and one or more CRM 322. CRM 322 can be used to store processor-executable instructions of one or more parameter generation component(s) 324, network performance monitor(s) 326, training component(s) 328, machine-learning engine(s) 330, session data components/data stores 332, and/or trained machine-learned models 334. As described above in more detail with reference to FIGS. 1 and 2, a parameter generation component 324, which may be similar or identical to the parameter generation components 110 and/or 210 may be configured to compute custom parameters (e.g., interlayer parameters) based on differences and/or ratios between network usage/performance data in different frequency layers. The network performance monitor 326, which may be similar or identical to the network performance monitor 114, may be configured to determine network usage or performance metrics (e.g., throughput, network speed, call quality, spectrum use, handovers, dropped calls, etc.). associated with one or more network nodes, cells, sectors, and/or layers. Training component 328, which may be similar or identical to the training component 120, may be configured to train machine-learned models 334, based on ground truth data, to output handover parameters. The session data components/data stores 332, which may be similar or identical to the data store 108, may be configured to receive and store various communication session data from the network nodes, including but not limited to KPI data, alarms, listings of current/previous handover parameters used by different network nodes, etc. The processor-executable instructions of modules 324-334 can be executed by the one or more processors 320 to perform various functions described herein. In some examples, server 304 can be configured to, e.g., by executing the processor-executable instructions, perform functions described herein with reference to FIGS. 1-2 and 6-7, e.g., receiving KPI data, determining custom parameters, training machine-learned models and determining handover parameters, etc.

In some examples, server 304 also includes or is communicatively connected with a UI 312 or similar subsystem. For example, server 304 can transmit Web pages and related data rendered by a browser on terminal 302 or another computing device, and can receive responses from those Web pages.

In some examples, processor 308 and, if required, CRM 310, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Other examples of control units can include processor 320 with, if required, CRM 322.

Figure 4:
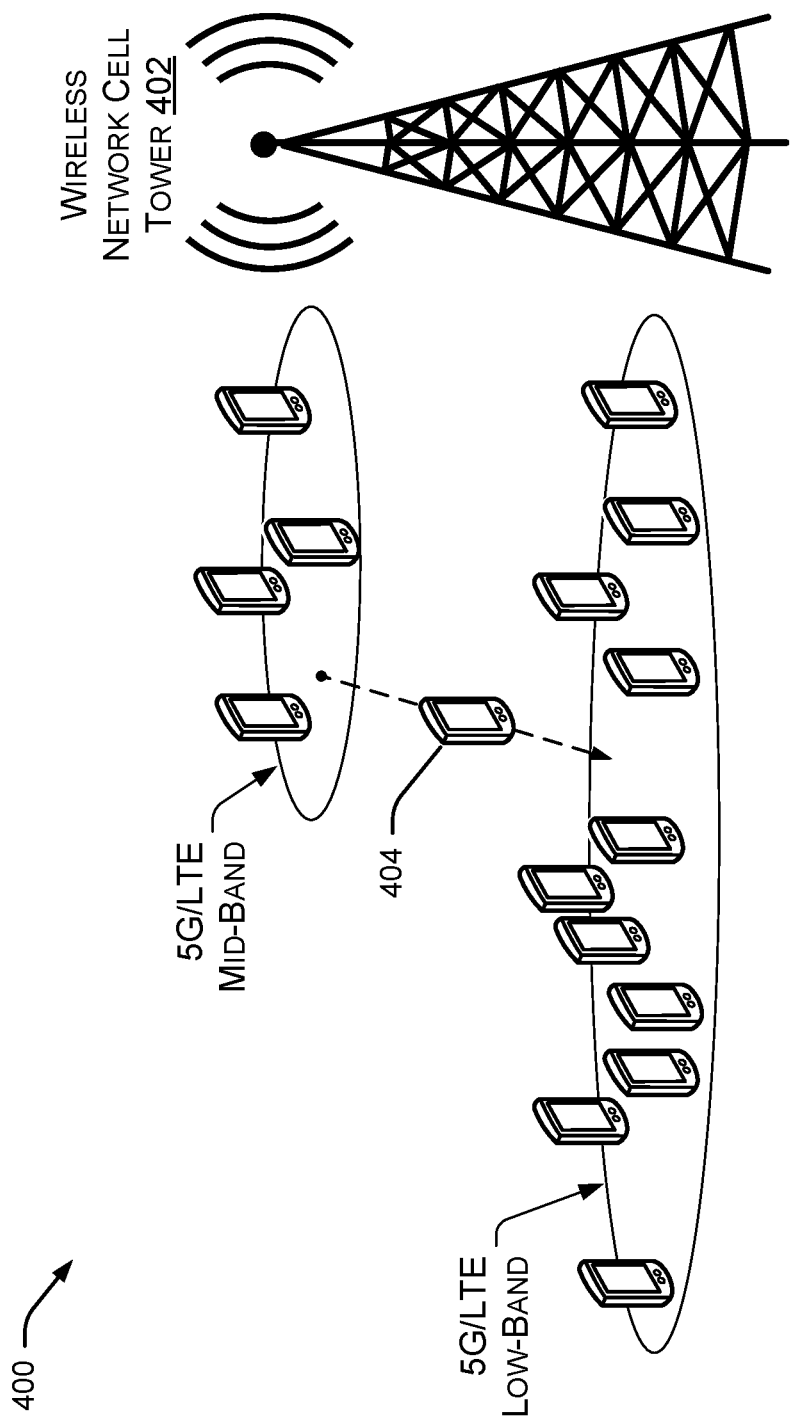
FIG. 4 is a diagram illustrating a handover operation for a user equipment terminal between two frequency layers of a wireless network, in accordance with one or more implementations of the disclosure.

FIG. 4 depicts an example interfrequency handover operation, by a UE device is handed over from one frequency layer to another frequency layer provided by the same cell and/or sensor (e.g., network node 104 or 204). As shown in this example, a cell tower 402 of a wireless network provides wireless network service to a number of UE devices, using at least two different frequency layers.

In this example, the cell tower 402 provides at least one 5G/LTE mid-band frequency layer, and at least one 5G/LTE low-band frequency layer. As described above, a frequency layer (or spectrum band) may correspond to a particular set or range of radio frequencies. Depending on the frequencies, the spectrum bands (or frequency layer) may be referred to as low band, mid band or high band (e.g., mmWave frequencies, where mmWave have relatively high frequencies). In some cases, low band frequencies (e.g., like 600 Mhz or 700 Mhz) may travel longer distances, and thus are better suited to longer-distance connections. Midband frequencies (e.g., like 1900 Mhz or 2100 Mhz) are better suited for middle-distance ranges, and mmWave frequencies (e.g., over 20000 Mhz) are much faster but have limited distance ranges.

In this example, the cell tower 402 may be configured to perform handovers of UE devices during live connections, using a number of handover parameters that define the conditions for when a UE device (e.g., UE device 404) is to be moved from a frequency layer, and to which frequency layer the UE device should be moved. For example, the cell tower 402 may include handover parameters, which may be applied to the entire cell tower 402 or to particular sectors and/or frequency ranges provided by the cell tower 402. As described above, the handover parameters used by the cell tower 401 may define threshold values relating to network coverage, signal strength, connection quality or speed, and the like.

As shown in this example, a UE device 404 is initially served by the cell tower 402 via a 5G/LTE mid-band frequency layer. Based on the communication session data associated with the UE device 404 (e.g., signal strength, connection quality or speed, etc.), the cell tower 402 may use the handover parameters to determine that UE device 404 is to be moved to a separate 5G/LTE mid-band frequency layer provided by the cell tower 402.

Figure 5:
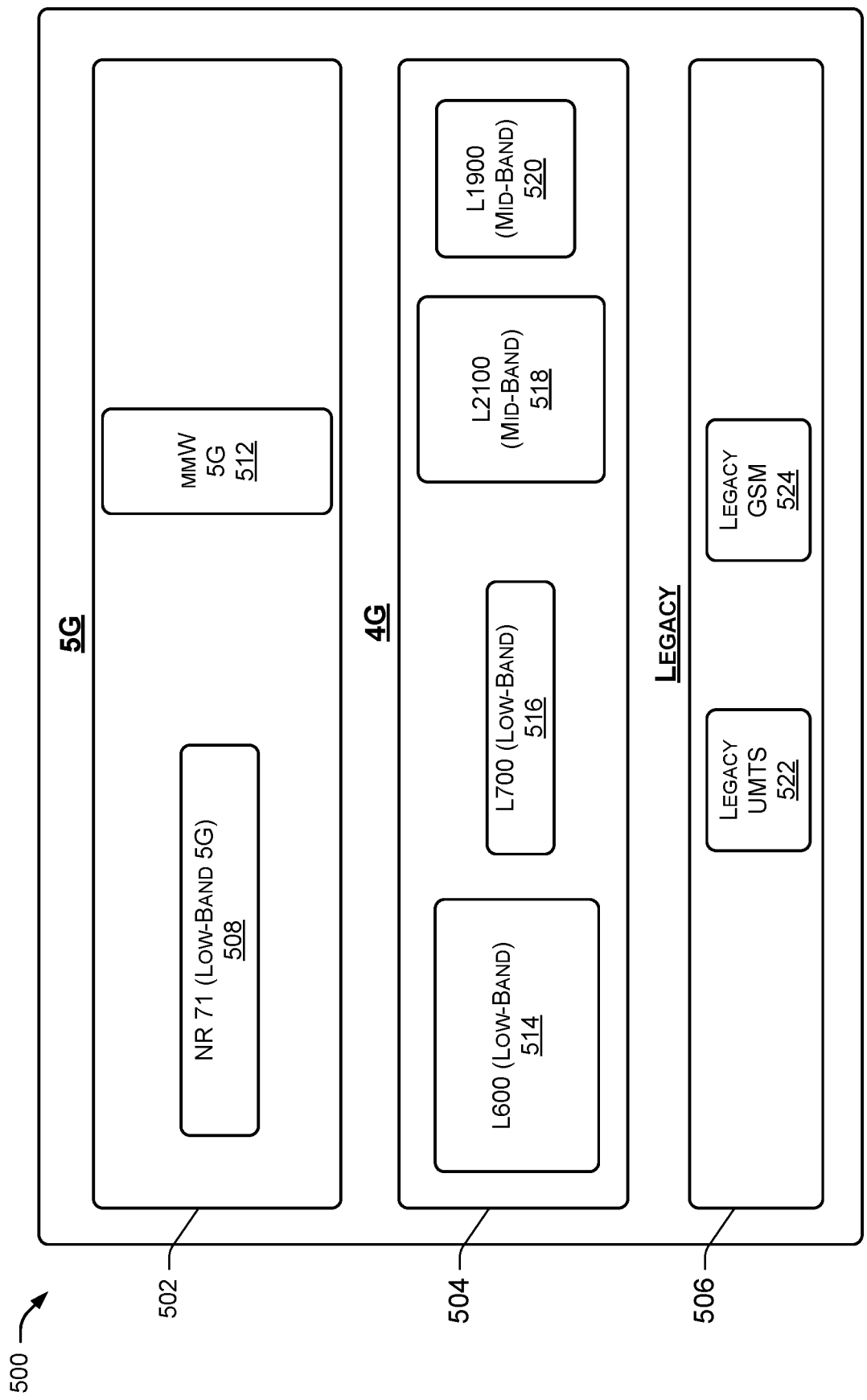
FIG. 5 is a block diagram illustrating different example frequency layers served by different radio access technologies, in accordance with one or more implementations of the disclosure.

FIG. 5 shows a block diagram within a graphical representation of an example set of frequency layers and radio access technologies that may be served by a network node 104 or 204 (e.g., a cell tower). In this example, a network node 500 serves a number of different frequency layers using (at least) three different radio access technologies: 5G/LTE 502, 4G 504, and legacy technologies 506 (e.g., 2G or 3G). The example frequency layers within the various radio access technologies 502-506 are depicted graphically as rectangles, where the height of the rectangle corresponds to the capacity of the frequency layer, and the width of the rectangle corresponds to the coverage (e.g., range) of the frequency layer.

In this example, the network node 500 supports (at least) three frequency layers using the 5G/LTE 502 radio access technology: an NR 71 low-band 5G frequency layer 508, and a relatively high band mmWave 5G frequency layer 512. The network node 500 also supports (at least) four additional frequency layers using the 4G 504 radio access technology: an L600 low-band 4G frequency layer 514, an L700 low-band 4G frequency layer 516, an L2100 mid-band 4G frequency layer 518, and an L1900 mid-band 4G frequency layer 520. Additionally, the network node 500 in this example supports (at least) two additional frequency layers using legacy radio access technologies: a legacy UMTS frequency layer 522, and a legacy GSM frequency layer 524. As described in detail herein, interfrequency handovers may be performed within a single network node or across nodes, and may include handovers from any frequency layer into any other frequency layer.

Although several specific examples of frequency layers are depicted in FIG. 5, it can be understood from the context of this disclosure that the techniques described herein are not limited to specific frequency layers. Rather, the determination and modification of handover parameters using the techniques described herein may be applicable to network traffic movement between any frequency layers. For instance, additional examples of frequency layers that may be deployed and used with these techniques are shown in the table below, although it is to be understood that these are non-limiting examples, and interfrequency handovers may be performed between any other frequency layers in other examples.

TABLE 1

Example Frequency Layers/Bands

| Site/Node | UMTS Cells | LTE Cells | NB-IoT Cells | 5G Cells |
|---|---|---|---|---|
| G = GSM | U = UMTS AWS | L = B4 (LTE AWS) | Z = NB-IoT AWS | H = N48 (CBRS 3.5 GHz) |
| U = UMTS | P = UMTS PCS | B = B2 (LTE PCS) | Y = NB-IoT PCS | I = N66 (AWS) |
| L = LTE | | C = B26 (LTE 850) | X = NB-IoT 700 | J = N2/N25 (PCS) |
| N = 5G | | D = B12 (LTE 700) | W = NB-IoT 600 | K = N71 (600 MHz) |
| S = SRAN | | E = B71 (LTE 600) | V = NB-IoT B85 | M = N257/261 (28 GHz) |
| M = MSMM | | F = B66 (LTE AWS 3) | | N = N260 (39 GHz) |
| | | G = B46 (LTE Unlicensed) | | O = N258 (24 GHz) |

TABLE 1-continued

Example Frequency Layers/Bands

| Site/Node | UMTS Cells | LTE Cells | NB-IoT Cells | 5G Cells |
|---|---|---|---|---|
| | | R = B48 (LTE CBRS) | | Q = N46 (5G LAA Unlicensed) |
| | | T = B41 (LTE 2.5 GHz) | | A = N41 (2.5 GHz) |
| | | | | S = 47 GHz |

Figure 6:
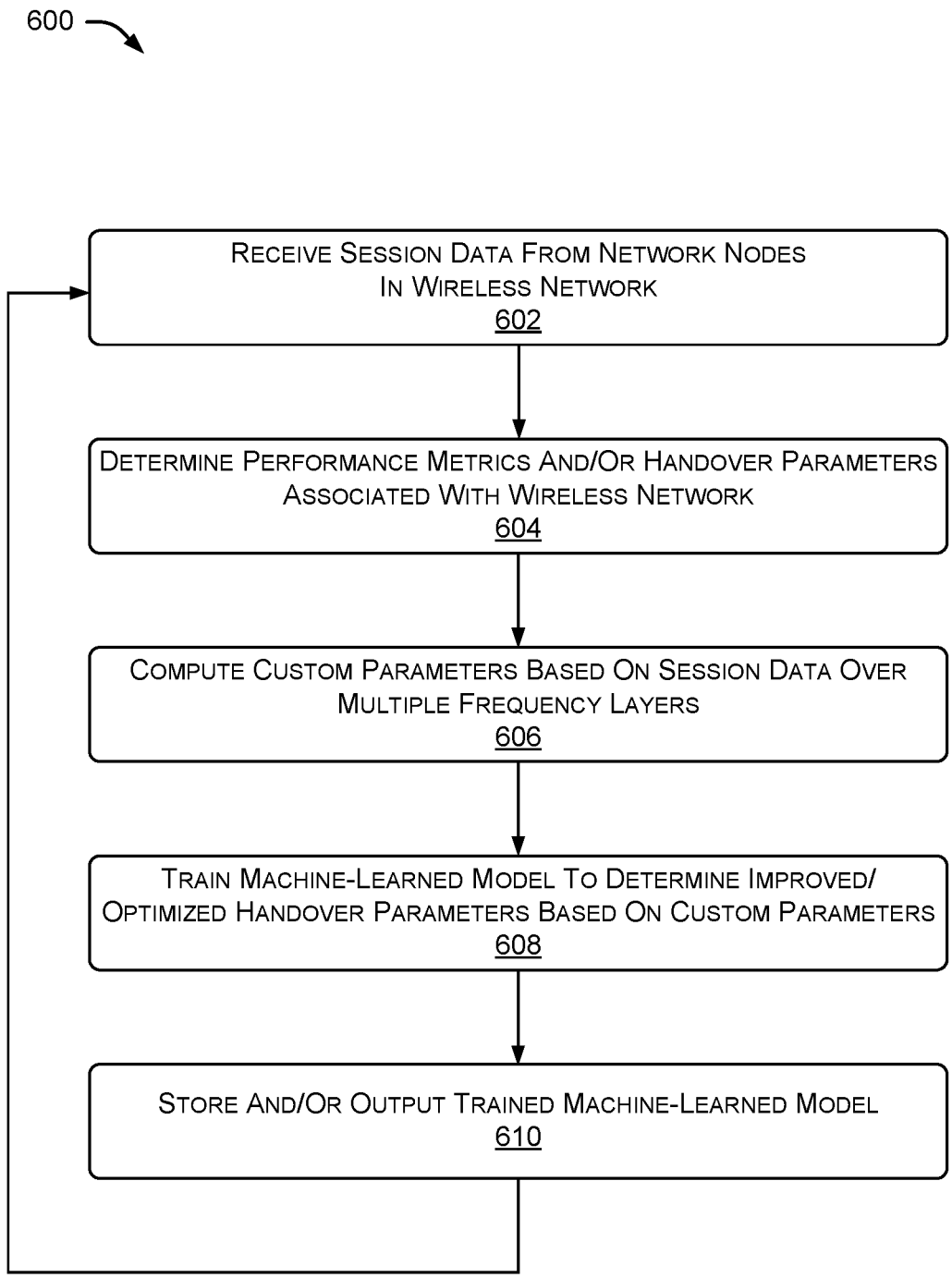
FIG. 6 illustrates an example process for training a machine-learned model to output a set of handover parameters associated with a wireless network, in accordance with one or more examples of the disclosure.

FIG. 6 is a flow diagram illustrating an example process 600 for training a machine-learned model to output a set of handover parameters associated with one or more nodes of a wireless network. As described below in more detail, the operations of process 600 can be performed, for example, by a service provider 106 based on data received from one or more network nodes 104 in a wireless network. In some examples, service provider 106 may be implemented on one or more server(s), and may include control unit(s) configured to perform the various operations described below. The operations described in connection with process 600 may be performed, for instance, in response to computer program instructions triggering the process, which may be triggered periodically based on a schedule, or in response to additional training data received from one or more network nodes, or may be triggered by a network operator or administrator.

Figure 7:
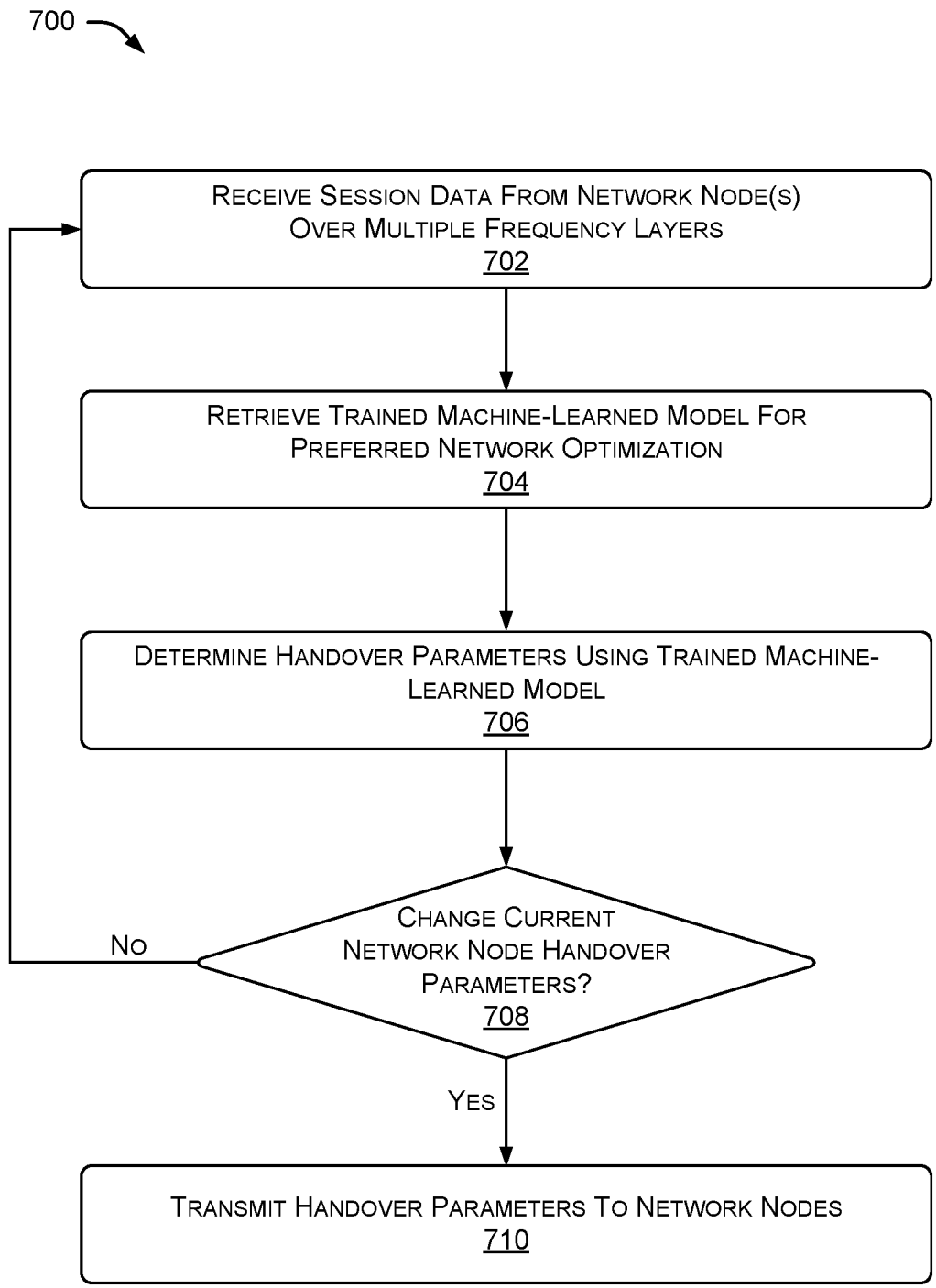
FIG. 7 illustrates an example process for training a machine-learned model to output a set of handover parameters associated with a wireless network, in accordance with one or more examples of the disclosure.

The operations shown in FIGS. 6 and 7, described below, can be performed in any order except when otherwise specified, or when data from an earlier step is used in a later step. For clarity of explanation, reference is herein made to various components shown in FIGS. 1 and 2 that can carry out or participate in the steps of the exemplary methods, and to various operations and messages that can occur while the exemplary method is carried out or as part of the exemplary method. It should be noted, however, that other components can be used; that is, exemplary method(s) shown in FIGS. 6 and 7 are not limited to being carried out by the identified components, and are not limited to including the identified operations or messages.

At operation 602, a wireless network service provider 106 (e.g., server, computing device) may receive data from one or more network nodes (e.g., network nodes 104) in the wireless network. As noted above, the data may include communication session data from various network nodes 104, representing the sessions between the nodes and various UE devices 102. The communication session data captured and transmitted by the nodes 104 may include, for example, KPI data, carrier-to-carrier interference ratios ("C/I"), received signal levels, network speed levels, path loss indicators, alarm events, and the like. The service provider 106 may store and aggregate the communication session data, along with associated data such as network performance metrics and the handover parameters used by the network nodes, within a communication session data store 108.

At operation 604, the service provider 106 may use the communication session data to determine network performance metrics and/or handover parameters associated with the network nodes 104. In some examples, the network performance metrics and/or handover parameters may be stored in or determined from the communication sessions data store 108. Network performance metrics may be determined based on preferred or desired metrics, which may differ depending on the configuration and/or preferences of the wireless network. For instance, network performance metrics may include metrics measuring throughput, network speed, call quality, spectrum use, cost minimization of dropped calls minimization, and the like. Different networks may emphasize and optimize for different combinations of performance metrics depending on the network criteria and operational goals of the network and service provider organization.

At operation 606, the service provider 106 may determine one or more custom parameters based on the interlayer communication session data received from the network nodes. As described above, custom parameters correspond to individual KPI data or may be calculated as combinations KPI data and/or other communication session data. In some examples, custom parameters may be calculated using a ratio and/or a difference in network usage data, performance data, and/or handover statistics, between two different frequency layers.

At operation 608, the service provider 106 may perform a training process to train one or more machine-learned models, and at operation 610, the service provider 106 may store and/or output the machine-learned models trained in operation 608. In some examples, a training component 120 may receive be used to train one or more machine-learned models, using as input ground truth data including the custom parameters, one or more network performance metrics determined by a network performance monitor, and the current set of handover parameters associated with the communication session data received in operation 602. The training component 120 may, in some cases, generate multiple trained models configured to improve or optimize particular network performance metrics. For instance, one model may be trained to optimize call quality, a second model may be trained to minimize network cost, a third model may be trained to maximize throughput and minimize dropped calls, etc.

FIG. 7 is a flow diagram illustrating another example process 700 for use a trained machine-learned model to determine a set of handover parameters, and configuring one or more nodes of a wireless network to operate using the determined handover parameters. As described below in more detail, the operations of process 700 can be performed, for example, by a service provider 206 based on data received from one or more network nodes 204 in a wireless network. In some examples, service provider 206 may be implemented on one or more server(s), and may include control unit(s) configured to perform the various operations described below. The operations described in connection with process 700 may be performed, for instance, in response to computer program instructions triggering the process, which may be triggered periodically based on a schedule, or in response to additional training data received from one or more network nodes, or may be triggered by a network operator or administrator.

At operation 702, a service provider 206 (e.g., server, computing device) associated with a wireless network may receive communication session data from a network node (or group of associated network nodes). In some examples, the service provider 206 may receive data from one or more network node(s) 204 (e.g., cell sites), based on a number of connections (or communication sessions) between the node(s) 204 and UE devices 202. The data received in operation 702 may include various different types of communication session data, and may be associated with the UE connections served by a single network node 204 or a group of associated nodes (e.g., a subset of cells within a related geographic region) over a period of time. The received data may include including connections served over multiple different frequency layers. In some cases, the received data may include data associated with particular sectors (e.g., and not other sectors) of a network node 204.

At operation 704, the service provider 206 may retrieve a trained machine-learned model associated with a desired performance metric and/or optimization. In some cases, a machine learning engine may select a particular machine-learned model based on a specific type of network performance metric to be improved or optimized on the network node(s) 204. For instance, different machine-learned models may be used to improve or optimize throughput, network speed, call quality, spectrum use, cost minimization of dropped calls minimization, etc.

At operation 706, the service provider 206 may execute the trained machine-learned model, based on the communication session data, to determine a set of handover parameters for the network node(s). For instance, the service provider 206 may compute a set of custom parameters, based on ratios or differences of network usage or performance metrics between different frequency layers. The custom parameters may be provided to the trained model, and the output of the trained model may correspond to the handover parameters.

At operation 708, the service provider 206 may determine whether a change in the handover parameters meets or exceeds a change threshold. In some examples, when the difference between the values of the handover parameters determined by the trained model, and the current handover parameters used by the network node(s) does not meets or exceed one or more threshold values (708: No), then the service provider 206 may determine that the current handover parameters used by the network node(s) are sufficient and need not be updated. In such cases, process 700 may return to operation 702 to await additional communication session data from the network node(s) 204. However, when the difference between the values of the handover parameters determined by the trained model, and the current handover parameters used by the network node(s) previous meets or exceeds one or more threshold values (708: Yes), then in operation 710 the service provider 206 may transmit the determined handover parameters to be used by the network node(s).

EXAMPLE CLAUSES

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A. A method, comprising: receiving, by a network node of a wireless communication network, data associated with a plurality of connections, wherein each connection of the plurality of connections is associated with a communication session between a mobile device and a network resource within the wireless communication network; determining, by the network node, a first value associated with a performance metric, based at least in part on a first subset of the data associated with a first frequency layer; determining, by the network node, a second value associated with the performance metric, based at least in part on a second subset of the data associated with a second frequency layer, wherein the second frequency layer is different from the first frequency layer; providing, by the network node, an input to a machine-learned model configured to determine at least one handover parameter for the wireless communication network, wherein the input is based at least in part on the first value and the second value; determining, by the network node, a first handover parameter based at least in part on an output of the machine-learned model; and configuring, by the network node, a first network resource of the wireless communication network, based at least in part on the first handover parameter.

B. The method of paragraph A, wherein: determining the first value comprises determining at least one of a first network utilization or a first network traffic volume associated with the first frequency layer, based at least in part on the first subset; determining the second value comprises determining at least one of a second network utilization or a second network traffic volume associated with the second frequency layer, based at least in part on the second subset; and the input includes a difference between the first value and the second value.

C. The method of paragraph A, further comprising: determining, based at least in part on the first subset and the second subset of the data, a number of handovers between the first frequency layer and the second frequency layer, wherein the input includes the number of handovers.

D. The method of paragraph A, wherein: the wireless communication network includes a first base station and a second base station; the first value and the second value of the performance metric are associated with the first base station; and the configuring includes configuring the first base station to operate in accordance with the first handover parameter.

E. The method of paragraph D, further comprising: determining a third value associated with a performance metric, based at least in part on the first subset of the data; determining a fourth value associated with a performance metric, based at least in part on the second subset of the data, wherein the third value and the fourth value are associated with the second base station; providing a second input to the machine-learned model, wherein the second input is based at least in part on the third value and the fourth value; determining a second handover parameter based at least in part on a second output of the machine-learned model, wherein the second handover parameter is different from the first handover parameter; and configuring the second base station to operate in accordance with the second handover parameter.

F. The method of paragraph D, wherein the first base station includes a first sector and a second sector, wherein the configuring includes configuring the first sector of the first base station to operate in accordance with the first handover parameter, and wherein the method further comprises: providing, to the machine-learned model, a second input associated with the second sector of the first base station; determining a second handover parameter based at least in part on a second output of the machine-learned model; and configuring the second sector of the first base station to operate in accordance with the second handover parameter.

G. The method of paragraph A, wherein the machine-learned model is configured to receive as input a plurality of performance metrics associated with the first network resource, and to output a plurality of handover parameters based on the plurality of performance metrics.

H. The method of paragraph A, further comprising: determining an attribute associated with a first connection between a first mobile device and the first network resource, wherein the first connection is associated with the first frequency layer; determining a threshold based at least in part on the first handover parameter; and initiating a handover operation for the first connection, based at least in part on comparing the attribute to the threshold, wherein the handover operation is configured to transfer the first connection from the first frequency layer to the second frequency layer.

I. A system comprising: one or more processors; and one or more non-transitory computer-readable media storing instructions that, when executed by the one or more processors, cause the one or more processors to perform operations comprising: receiving data associated with a plurality of connections, wherein each connection of the plurality of connections is associated with a communication session between a mobile device and a network resource within a wireless network; determining a first value associated with a performance metric, based at least in part on a first subset of the data associated with a first frequency layer; determining a second value associated with the performance metric, based at least in part on a second subset of the data associated with a second frequency layer, wherein the second frequency layer is different from the first frequency layer; providing an input to a machine-learned model configured to determine a first handover parameter for the wireless network, wherein the input is based at least in part on the first value and the second value; determining the first handover parameter based at least in part on an output of the machine-learned model; and configuring a first network resource of the wireless network, based at least in part on the first handover parameter.

J. The system of paragraph I, wherein: determining the first value comprises determining at least one of a first network utilization or a first network traffic volume associated with the first frequency layer, based at least in part on the first subset; determining the second value comprises determining at least one of a second network utilization or a second network traffic volume associated with the second frequency layer, based at least in part on the second subset; and the input includes a difference between the first value and the second value.

K. The system of paragraph I, the operations further comprising: determining, based at least in part on the first subset and the second subset of the data, a number of handovers between the first frequency layer and the second frequency layer, wherein the input includes the number of handovers.

L. The system of paragraph I, wherein: the wireless network includes a first base station and a second base station; the first value and the second value of the performance metric are associated with the first base station; and the configuring includes configuring the first base station to operate in accordance with the first handover parameter.

M. The system of paragraph L, the operations further comprising: determining a third value associated with a performance metric, based at least in part on the first subset of the data; determining a fourth value associated with a performance metric, based at least in part on the second subset of the data, wherein the third value and the fourth value are associated with the second base station; providing a second input to the machine-learned model, wherein the second input is based at least in part on the third value and the fourth value; determining a second handover parameter based at least in part on a second output of the machine-learned model, wherein the second handover parameter is different from the first handover parameter; and configuring the second base station to operate in accordance with the second handover parameter.

N. The system of paragraph L, wherein the first base station includes a first sector and a second sector, wherein the configuring includes configuring the first sector of the first base station to operate in accordance with the first handover parameter, and wherein the operations further comprise: providing, to the machine-learned model, a second input associated with the second sector of the first base station; determining a second handover parameter based at least in part on a second output of the machine-learned model; and configuring the second sector of the first base station to operate in accordance with the second handover parameter.

O. The system of paragraph I, wherein the machine-learned model is configured to receive as input a plurality of performance metrics associated with the first network resource, and to output a plurality of handover parameters based on the plurality of performance metrics.

P. The system of paragraph I, the operations further comprising: determining an attribute associated with a first connection between a first mobile device and the first network resource, wherein the first connection is associated with the first frequency layer; determining a threshold based at least in part on the first handover parameter; and initiating a handover operation for the first connection, based at least in part on comparing the attribute to the threshold, wherein the handover operation is configured to transfer the first connection from the first frequency layer to the second frequency layer.

Q. One or more non transitory computer readable media storing instructions executable by a processor, wherein the instructions, when executed, cause the processor to perform operations comprising: receiving data associated with a plurality of connections, wherein each connection of the plurality of connections is associated with a communication session between a mobile device and a network resource within a wireless network; determining a first value associated with a performance metric, based at least in part on a first subset of the data associated with a first frequency layer; determining a second value associated with the performance metric, based at least in part on a second subset of the data associated with a second frequency layer, wherein the second frequency layer is different from the first frequency layer; providing an input to a machine-learned model configured to determine a first handover parameter for the wireless network, wherein the input is based at least in part on the first value and the second value; determining the first handover parameter based at least in part on an output of the machine-learned model; and configuring a first network resource of the wireless network, based at least in part on the first handover parameter.

R. The one or more non transitory computer readable media of paragraph Q, wherein: determining the first value comprises determining at least one of a first network utilization or a first network traffic volume associated with the first frequency layer, based at least in part on the first subset; determining the second value comprises determining at least one of a second network utilization or a second network traffic volume associated with the second frequency layer, based at least in part on the second subset; and the input includes a difference between the first value and the second value.

S. The one or more non transitory computer readable media of paragraph Q, wherein: the wireless network includes a first base station and a second base station; the first value and the second value of the performance metric are associated with the first base station; and the configuring includes configuring the first base station to operate in accordance with the first handover parameter.

T. The one or more non transitory computer readable media of paragraph S, the operations further comprising: determining a third value associated with a performance metric, based at least in part on the first subset of the data; determining a fourth value associated with a performance metric, based at least in part on the second subset of the data, wherein the third value and the fourth value are associated with the second base station; providing a second input to the machine-learned model, wherein the second input is based at least in part on the third value and the fourth value; determining a second handover parameter based at least in part on a second output of the machine-learned model, wherein the second handover parameter is different from the first handover parameter; and configuring the second base station to operate in accordance with the second handover parameter.

CONCLUSION

Many variations and modifications can be made to the above-described examples, the elements of which are to be understood as being among other acceptable examples. All such modifications and variations are intended to be included herein within the scope of this disclosure and protected by the claims. Moreover, this disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

The methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem.

Example computer-implemented operations described herein can additionally or alternatively be embodied in specialized computer hardware, e.g., FPGAs. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

In the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A method, comprising:
   receiving, by a network node of a wireless communication network, data associated with a plurality of connections, wherein each connection of the plurality of connections is associated with a communication session between a mobile device and a network resource within the wireless communication network;

determining, by the network node, a first value associated with a performance metric, based at least in part on a first subset of the data associated with a first frequency layer, wherein determining the first value comprises determining at least one of a first network utilization or a first network traffic volume associated with the first frequency layer, based at least in part on the first subset;

determining, by the network node, a second value associated with the performance metric, based at least in part on a second subset of the data associated with a second frequency layer, wherein the second frequency layer is different from the first frequency layer, wherein determining the second value comprises determining at least one of a second network utilization or a second network traffic volume associated with the second frequency layer, based at least in part on the second subset;

providing, by the network node, an input to a machine-learned model configured to determine at least one handover parameter for the wireless communication network, wherein the input is based at least in part on the first value and the second value and includes a difference between the first value and the second value;

determining, by the network node, a first handover parameter based at least in part on an output of the machine-learned model; and configuring, by the network node, a first network resource of the wireless communication network, based at least in part on the first handover parameter.

2. The method of claim 1, further comprising:
determining, based at least in part on the first subset and the second subset of the data, a number of handovers between the first frequency layer and the second frequency layer, wherein the input further includes the number of handovers.

3. The method of claim 1, wherein:
the wireless communication network includes a first base station and a second base station;
the first value and the second value of the performance metric are associated with the first base station; and
the configuring includes configuring the first base station to operate in accordance with the first handover parameter.

4. The method of claim 3, further comprising:
determining a third value associated with a performance metric, based at least in part on the first subset of the data;
determining a fourth value associated with a performance metric, based at least in part on the second subset of the data, wherein the third value and the fourth value are associated with the second base station;
providing a second input to the machine-learned model, wherein the second input is based at least in part on the third value and the fourth value;
determining a second handover parameter based at least in part on a second output of the machine-learned model, wherein the second handover parameter is different from the first handover parameter; and
configuring the second base station to operate in accordance with the second handover parameter.

5. The method of claim 3, wherein the first base station includes a first sector and a second sector, wherein the configuring includes configuring the first sector of the first base station to operate in accordance with the first handover parameter, and wherein the method further comprises:
providing, to the machine-learned model, a second input associated with the second sector of the first base station;
determining a second handover parameter based at least in part on a second output of the machine-learned model; and
configuring the second sector of the first base station to operate in accordance with the second handover parameter.

6. The method of claim 1, wherein the machine-learned model is configured to receive as input a plurality of performance metrics associated with the first network resource, and to output a plurality of handover parameters based on the plurality of performance metrics.

7. The method of claim 1, further comprising:
determining an attribute associated with a first connection between a first mobile device and the first network resource, wherein the first connection is associated with the first frequency layer;
determining a threshold based at least in part on the first handover parameter; and
initiating a handover operation for the first connection, based at least in part on comparing the attribute to the threshold, wherein the handover operation is configured to transfer the first connection from the first frequency layer to the second frequency layer.

8. A system comprising:
one or more processors; and
one or more non-transitory computer-readable media storing instructions that, when executed by the one or more processors, cause the one or more processors to perform operations comprising:
receiving data associated with a plurality of connections, wherein each connection of the plurality of connections is associated with a communication session between a mobile device and a network resource within a wireless network;
determining a first value associated with a performance metric, based at least in part on a first subset of the data associated with a first frequency layer;
determining a second value associated with the performance metric, based at least in part on a second subset of the data associated with a second frequency layer, wherein the second frequency layer is different from the first frequency layer;
determining, based at least in part on the first subset and the second subset of the data, a number of handovers between the first frequency layer and the second frequency layer;
providing an input to a machine-learned model configured to determine a first handover parameter for the wireless network, wherein the input is based at least in part on the first value and the second value and includes the number of handovers;
determining the first handover parameter based at least in part on an output of the machine-learned model; and
configuring a first network resource of the wireless network, based at least in part on the first handover parameter.

9. The system of claim 8, wherein:
determining the first value comprises determining at least one of a first network utilization or a first network traffic volume associated with the first frequency layer, based at least in part on the first subset;

determining the second value comprises determining at least one of a second network utilization or a second network traffic volume associated with the second frequency layer, based at least in part on the second subset; and the input further includes a difference between the first value and the second value.

10. The system of claim 8, wherein:

the wireless network includes a first base station and a second base station;

the first value and the second value of the performance metric are associated with the first base station; and the configuring includes configuring the first base station to operate in accordance with the first handover parameter.

11. The system of claim 10, the operations further comprising:

determining a third value associated with a performance metric, based at least in part on the first subset of the data;

determining a fourth value associated with a performance metric, based at least in part on the second subset of the data, wherein the third value and the fourth value are associated with the second base station;

providing a second input to the machine-learned model, wherein the second input is based at least in part on the third value and the fourth value;

determining a second handover parameter based at least in part on a second output of the machine-learned model, wherein the second handover parameter is different from the first handover parameter; and configuring the second base station to operate in accordance with the second handover parameter.

12. The system of claim 10, wherein the first base station includes a first sector and a second sector, wherein the configuring includes configuring the first sector of the first base station to operate in accordance with the first handover parameter, and wherein the operations further comprise:

providing, to the machine-learned model, a second input associated with the second sector of the first base station;

determining a second handover parameter based at least in part on a second output of the machine-learned model; and configuring the second sector of the first base station to operate in accordance with the second handover parameter.

13. The system of claim 8, wherein the machine-learned model is configured to receive as input a plurality of performance metrics associated with the first network resource, and to output a plurality of handover parameters based on the plurality of performance metrics.

14. The system of claim 8, the operations further comprising:

determining an attribute associated with a first connection between a first mobile device and the first network resource, wherein the first connection is associated with the first frequency layer;

determining a threshold based at least in part on the first handover parameter; and initiating a handover operation for the first connection, based at least in part on comparing the attribute to the threshold, wherein the handover operation is configured to transfer the first connection from the first frequency layer to the second frequency layer.

15. One or more non-transitory computer-readable media storing instructions executable by a processor, wherein the instructions, when executed, cause the processor to perform operations comprising:

receiving data associated with a plurality of connections, wherein each connection of the plurality of connections is associated with a communication session between a mobile device and a network resource within a wireless network, wherein the wireless network includes a first base station and a second base station;

determining a first value associated with a performance metric, based at least in part on a first subset of the data associated with a first frequency layer;

determining a second value associated with the performance metric, based at least in part on a second subset of the data associated with a second frequency layer, wherein the second frequency layer is different from the first frequency layer, wherein the first value and the second value of the performance metric are associated with the first base station;

providing an input to a machine-learned model configured to determine a first handover parameter for the wireless network, wherein the input is based at least in part on the first value and the second value;

determining the first handover parameter based at least in part on an output of the machine-learned model;

configuring a first network resource of the wireless network, based at least in part on the first handover parameter, wherein the configuring includes configuring the first base station to operate in accordance with the first handover parameter;

determining a third value associated with a performance metric, based at least in part on the first subset of the data;

determining a fourth value associated with a performance metric, based at least in part on the second subset of the data, wherein the third value and the fourth value are associated with the second base station;

providing a second input to the machine-learned model, wherein the second input is based at least in part on the third value and the fourth value;

determining a second handover parameter based at least in part on a second output of the machine-learned model, wherein the second handover parameter is different from the first handover parameter; and configuring the second base station to operate in accordance with the second handover parameter.

16. The one or more non-transitory computer-readable media of claim 15, wherein:

determining the first value comprises determining at least one of a first network utilization or a first network traffic volume associated with the first frequency layer, based at least in part on the first subset;

determining the second value comprises determining at least one of a second network utilization or a second network traffic volume associated with the second frequency layer, based at least in part on the second subset; and the input includes a difference between the first value and the second value.

* * * * *